April 7, 1970

J. LEBRA 3,504,608

MECHANICAL LOCKING DEVICE FOR A FILM
MAGAZINE IN A MAGAZINE SUPPORT

Filed Sept. 19, 1966

INVENTOR.
JACQUES LEBRA
BY

AGENT

INVENTOR.
JACQUES LEBRA

United States Patent Office 3,504,608
Patented Apr. 7, 1970

3,504,608
MECHANICAL LOCKING DEVICE FOR A FILM MAGAZINE IN A MAGAZINE SUPPORT
Jacques Lebra, Sartrouville, Seine-et-Oise, France, assignor, by mesne assignments, to U.S. Philips Corporation, New York, N.Y., a corporation of Delaware
Filed Sept. 19, 1966, Ser. No. 580,422
Claims priority, application France, Sept. 20, 1965, 31,987
Int. Cl. G03b 19/10
U.S. Cl. 95—19                                8 Claims

ABSTRACT OF THE DISCLOSURE

This invention relates to a support having an aperture into which a magazine is insertable and a device for releasably locking the magazine therein. The device includes a bolt which is initially locked from pivoting and is moved axially away from the aperture upon insertion of a magazine, and is returned axially toward the aperture for locking the magazine therein. An arm is subsequently pivoted which releases the bolt to pivot and allow ejection of the magazine.

---

The invention relates to a mechanical locking device for a film magazine in a magazine support, which device consists of a bolt displaceable at right angles to the travelling direction of the magazine and having a bevelled end face on which an outwardly directed pressure is exerted by the magazine when it moves in one direction. This pressure is opposite to the force of a spring counteracting the displacement of the bolt. The magazine may be readily introduced into the support in a position in which it has been moved past the bolt which is set by the spring to its initial position and thus prevents the magazine from sliding out of the support. The removal of the magazine requires that the bolt must be depressed, which operation must be carried out separately, is time-consuming, and involves difficulties, since the space available is often greatly limited.

The object of the invention is to obviate this disadvantage. According to the invention, the bolt is rotatably secured to an arm pivotally connected to the support and is provided with a recess enclosing a pawl so that the bolt is displaced rectilinearly. Upon removal of the pawl the bolt can rotate and the magazine can be removed from the support in the opposite direction. When the pawl is adapted to rotate about a shaft provided on the support beside the pivot shaft of this arm, it can be connected to the pivot shaft by means of a spring so that only one spring is required for counteracting the displacement of the pawl and the bolt. A lever rotatably secured to the support, one end of which is in contact with the pawl may facilitate in a simple manner the lifting of the pawl when a push-botton causing the other end of the lever to be displaced is secured to the support.

Figure 1:
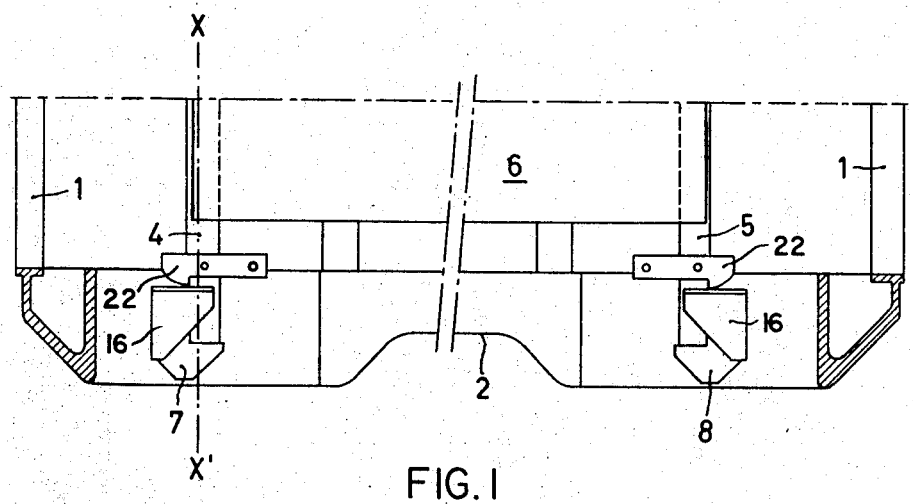
Figure 2:
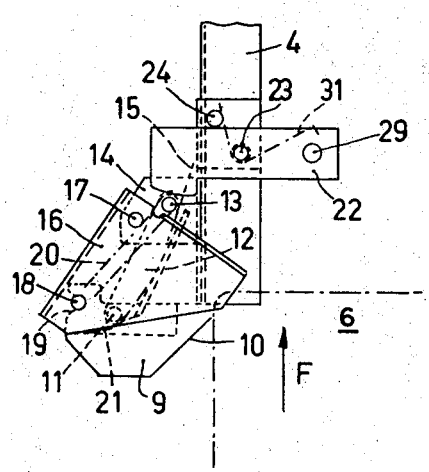
Figure 3:
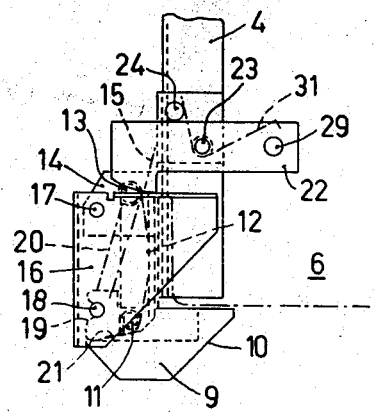
Figure 4:
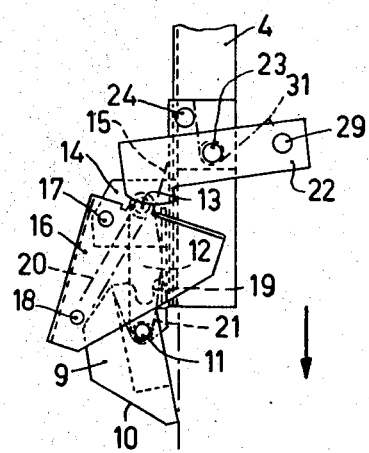
Figure 5:
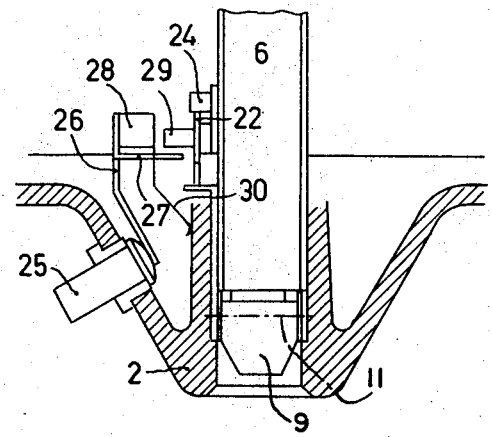

The invention will now be described more fully, by way of example, with reference to the accompanying drawing, in which:

FIGURE 1 is a sectional view of the front part of the magazine support taken on a plane parallel to the large wall of the magazine, FIGURES 2, 3 and 4 show the locking mechanism in various positions (during the insertion, the locking and the ejection of the magazine), FIGURE 5 is a sectional view of the front part taken on a plane at right angles to the axis X–X' (FIGURE 1).

FIGURE 1 only shows the front part of the apparatus 1 which consists of a casting the cross-section of which has the shape denoted by reference numeral 2 and which is provided with an aperture extending substantially throughout its width. The support has two rails 4 and 5 between which the magazine 6 is displaceable. The distance between the rails is adjustable so that it may be adapted to magazines of different widths. The locking device has a double construction and consists, as shown in FIGURE 1, of two identical mechanisms 7 and 8 which are each individually connected to an end of a rail lying beside the aperture.

One of the two locking mechanisms which together ensure the locking will be described more fully with reference to FIGURES 2, 3 and 4. It includes a bolt 9 which locks the rail 4 in the locking position (FIGURE 3), and which has a bevelled face 10. The bolt 9 is adapted to rotate about a shaft 11 secured to a rigid arm 12 which is journalled by means of a shaft 13 on a protruding part 14 of the support. It is thus achieved that upon displacement of the magazine in the direction of the arrow F, the bolt 9 is pressed outwards. A spring 15 on the shaft 13 ensures that the bolt reassumes its initial position immediately after the magazine has been displaced further on the rails.

The locking mechanism further includes a rectangular body 16 which is journalled by means of the shaft 17 on the protruding part 14. A second shaft 18 of the rectangular body acts as a pawl fitting into a recess 19 of the bolt 9. The two shafts 13 and 18 are elastically interconnected by means of a spring 20 and a spring 21 is provided on the shaft 11; the functions of these various parts will be explained below.

A lever 22 is journalled by means of a shaft 23 on the rail 4, a stop 24 preventing the movement of the lever in one direction. The lever is initially in rest position and in contact with the rectangular body 16. When the magazine must be removed from the support, the user may operate the lever 22 and thus cause it to rotate about the shaft 23, as will be explained with reference to FIGURE 5.

When the lever 22 is actuated, the rectangular body 16 rotates about the shaft 17 and lifts the pawl 18 from the notch 19 so that the bolt 9 is unlocked (FIGURE 4). The latter rotates about the shaft 11 and unlocks the end of the rail 4. The magazine can now be removed and may be readily received by the user of the apparatus. The bolt 9 and the rectangular body 16 then reassume the positions shown in FIGURE 3 due to the action of the springs 20 and 21.

FIGURE 5 shows the manner in which the rotary movement of the lever 22 is performed. A push-button 25 is provided on the casting 2. When this push-button is operated, plates 26 and 27 rotate about a shaft 28. The shaft 28 couples the two locking mechanisms 7 and 8 with one another (FIGURE 1) and ensures that corresponding plates of the two locking systems are displaced in the same manner (not shown in FIGURE 2).

During its displacement, the plate 27 gets into contact with a stop 29, whereupon the lever 22 is rotated and the pawl 18 is lifted so that this bolt 9 can perform the rotary movement described above. Due to the action of the springs 30 and 31, the plate 27 and the lever 22 reassume their initial positions.

Thus, the rotary movement of the bolt 9 is controlled in a very simple manner in that the push-buttom 25 is depressed. This button is provided on the casting 2 at the level of the aperture so that the hand of the user is in the correct position for receiving the ejected magazine when the button is depressed.

The invention is not limited to the embodiments described which may be varied within the scope of the invention; more particularly, parts of different shapes and also other means for controlling the rotary movement of the lever may be chosen.

What is claimed is:

1. In a support having an aperture into which a magazine is insertable along a first path, a device for releasably locking the magazine in the aperture, the device comprising:
   (a) an arm having one end mounted pivotally on the support, and a remote end;
   (b) a bolt pivotally mounted on the arm's remote end and having a catch part, the bolt being displaceable reversibly along a second path generally normal to the first path, between (i) a locked position where it extends at least partially into the said first path, and (ii) an open position clear of the first path, the bolt also pivotal from the locked position to an ejection position clear of the first path,
   (c) a body mounted pivotally on the support and having a pawl which is engageable to said catch part of the bolt for preventing the bolt from pivoting while in its locked position, the body when pivoted disengaging the pawl and catch and thereby permitting pivoting of the bolt to its ejection position, and
   (d) spring means secured to the support and urging the bolt to its locked position.

2. A device as defined in claim 1 further comprising a lever having one end pivotally mounted on the support and a remote end engaged to said body, the lever being pivotable from rest position to operative position for pivoting said body whereby the pawl and catch become disengaged.

3. A device as defined in claim 1 wherein said support comprises a pair of spaced rail means between which is defined said aperture into which said magaine is slidable, whereby the magazine contacts and pushes the bolt from locked to open position.

4. A device as defined in claim 1 wherein said spring means comprises first and second springs respectively urging the bolt to move generally laterally along said second path and rotatably toward the bolt's locked position.

5. A device as defined in claim 2 further comprising a third spring urging the lever toward its rest position.

6. A device as defined in claim 2 further comprising a push button mounted to the support and engageable to said lever for said pivoting thereof.

7. In a support having an aperture into which a magazine is insertable along a first path, a device for releasably locking the magazine in the aperture, the device comprising:
   (a) a bolt mounted on the support and reversibly displaceable between an open position clear of said first path and a locked position extending at least partially in said path, and pivotable from the locked position to an ejection position also clear of said first path;
   (b) first means for locking the bolt from pivoting while it is in the locked and open positions,
   (c) second means for releasing said first means for permitting the bolt to be pivotable, and
   (d) spring means urging the bolt toward its locked and unpivoted position, whereby (1) the magazine upon its insertion along said first path, contacts and pushes the bolt from locked to open position, (2) the spring means subsequently returns the bolt to locked position, and (3) the second means is operable to release said first locking means for ejection of the magazine.

8. A device as defined in claim 1, wherein said spring means is a stretchable spring having one end engaging a portion of the support, and its remote end engaging a portion of said body urging same to pivot for engaging the bolt in its locked position.

References Cited

UNITED STATES PATENTS 413,474  10/1889  Balston _____ 95—19

JOHN M. HORAN, Primary Examiner

U.S. Cl. X.R.

95—19